United States Patent
Shao et al.

(10) Patent No.: US 7,177,271 B2
(45) Date of Patent: Feb. 13, 2007

(54) METHOD AND SYSTEM FOR MANAGING ADMISSION TO A NETWORK

(75) Inventors: Huai-Rong Shao, Beijing (CN);
Wenwu Zhu, Basking Ridge, NJ (US);
Ya-Qin Zhang, West Windsor, NJ (US);
Jian-Ming Qiu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 09/960,810

(22) Filed: Sep. 21, 2001

(65) Prior Publication Data

US 2003/0058792 A1 Mar. 27, 2003

(51) Int. Cl.
*G01R 31/08* (2006.01)

(52) U.S. Cl. .................. 370/229; 370/230; 370/232; 370/395.2

(58) Field of Classification Search ............ 370/229, 370/230, 230.1, 232–236, 395.2, 230.2
See application file for complete search history.

(56) References Cited

U.S. PATENT DOCUMENTS

| | | | | |
|---|---|---|---|---|
| 4,984,264 A | * | 1/1991 | Katsube | 379/197 |
| 5,193,151 A | * | 3/1993 | Jain | 709/237 |
| 5,477,531 A | * | 12/1995 | McKee et al. | 370/249 |
| 5,521,907 A | * | 5/1996 | Ennis et al. | 370/253 |
| 5,612,949 A | * | 3/1997 | Bennett | 370/253 |
| 6,310,857 B1 | * | 10/2001 | Duffield et al. | 370/232 |
| 6,490,249 B1 | * | 12/2002 | Aboul-Magd et al. | 370/232 |
| 6,538,989 B1 | * | 3/2003 | Carter et al. | 370/229 |
| 6,594,268 B1 | * | 7/2003 | Aukia et al. | 370/400 |
| 6,661,797 B1 | * | 12/2003 | Goel et al. | 370/395.21 |
| 6,671,261 B1 | * | 12/2003 | Cheung | 370/252 |
| 6,711,137 B1 | * | 3/2004 | Klassen et al. | 370/252 |
| 6,741,569 B1 | * | 5/2004 | Clark | 370/252 |
| 6,801,501 B1 | * | 10/2004 | Knightly et al. | 370/233 |
| 6,839,328 B2 | * | 1/2005 | Lau et al. | 370/252 |
| 6,850,491 B1 | * | 2/2005 | Firoiu et al. | 370/235 |
| 6,898,182 B1 | * | 5/2005 | Cloonan | 370/232 |
| 6,909,693 B1 | * | 6/2005 | Firoiu et al. | 370/235 |
| 2002/0116154 A1 | * | 8/2002 | Nowak et al. | 702/186 |

OTHER PUBLICATIONS

Lai, Kevin, et al., "Measuring Bandwidth", *IEEE* 1999, pp. 235-245.
Elek, Viktória, et al., "Admission Control Based on End-to-End Measurements", *IEEE INFOCOM 2000*, (Mar. 2000), pp. 623-630.

(Continued)

*Primary Examiner*—Ricky Q. Ngo
*Assistant Examiner*—Andrew C. Lee
(74) *Attorney, Agent, or Firm*—Microsoft Corporation

(57) ABSTRACT

A method and system for managing admission to a network considers the packet delay of the network in making an admission decision. The packet delay of the network is periodically probed. To avoid disturbing or impairing the traffic of the network, a sequence of probing packets is sent to the network at an irregular interval. Responses to the probing packets are analyzed to obtain delay information of the network. If the delay information is insufficient to make an admission decision, then the packet loss rate of the network is measured and considered.

16 Claims, 7 Drawing Sheets

OTHER PUBLICATIONS

Misic, Jelena, et al., "Adaptive Admission Control in Wireless Multimedia Networks Under Nonuniform Traffic Conditions", *IEEE Journal on Selected Areas in Communications*, vol. 18, No. 11, (Nov. 2000), pp. 2429-2442.

Paxson, Vern, "Measurements and Analysis of End-to-End Internet Dynamics", *Ph.D. Thesis, University of California, Berkley*, (Apr. 1997), pp. 1-386.

Breslau, Lee, et al., "Endpoint Admission Control: Architectural Issues and Performance", *ACM SIGCOMM '00*, pp. 57-69.

Breslau, Lee, et al., "Comments on the Performance of Measurement-Based Admission Control Algorithms", *IEEE INFOCOM 2000*, pp. 1233-1242.

Choi, et al., "Endpoint Admission Control: Network Based Approach", *IEEE 2001*, pp. 227-235.

Jamin, Sugih, et al., "Comparison of Measurement-Based Admission Control Algorithms for Controlled-Load Service", *IEEE 1997*, pp. 973-980.

Qui, Jingyu, et al., "Measurement-Based Admission Control with Aggregate Traffic Envelopes", *IEEE/ACM Transactions on Networking*, vol. 9, No. 2 (Apr. 2001), pp. 199-210.

* cited by examiner

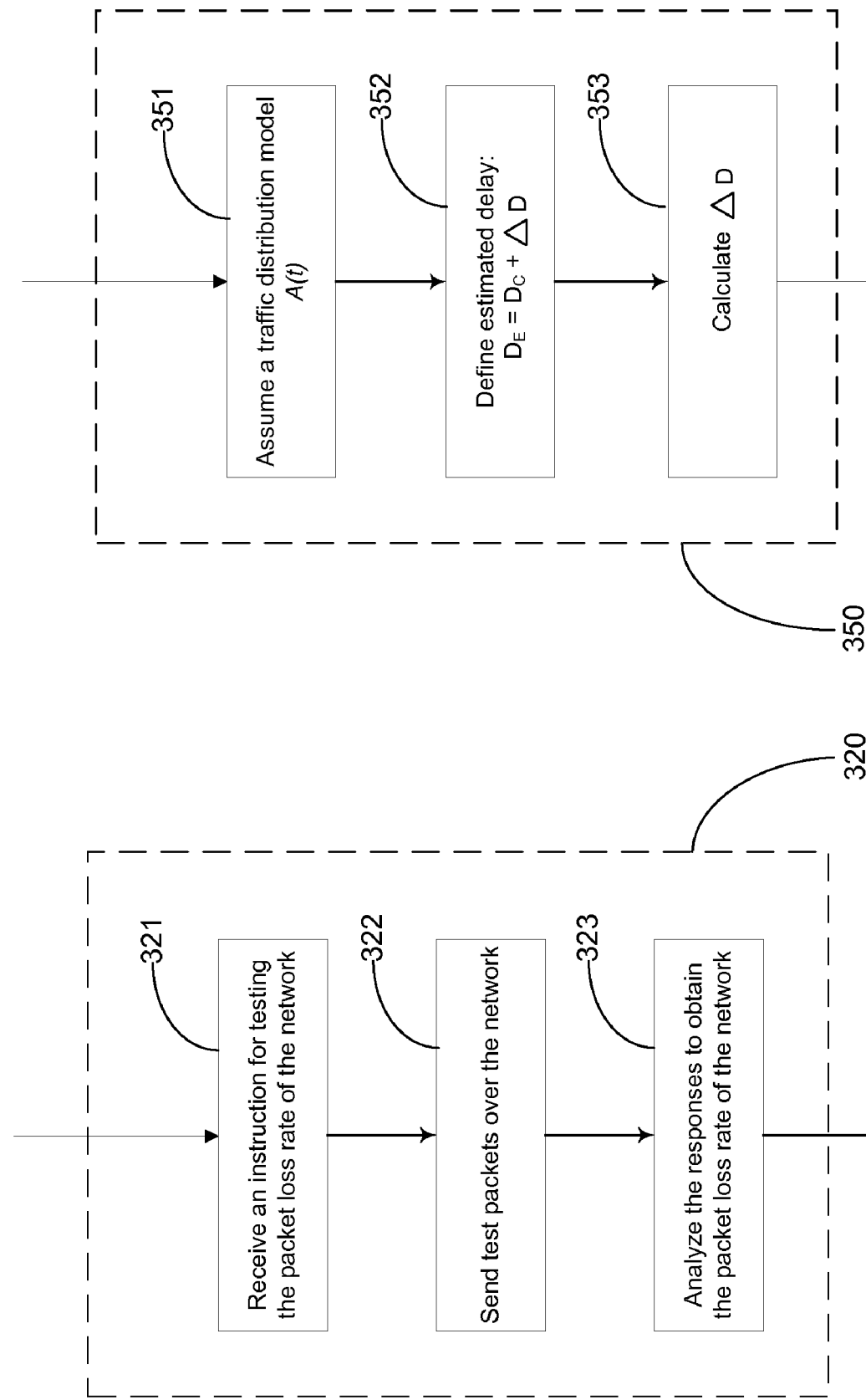

METHOD AND SYSTEM FOR MANAGING ADMISSION TO A NETWORK

TECHNICAL FIELD

The invention relates generally to the admission control in networks, and, more particularly, to admission control based on the packet delay and packet loss rate characteristics of a network.

BACKGROUND OF THE INVENTION

In the field of networking, a primary goal of admission control is to admit the maximum amount of data possible. For real-time services that do not have stringent requirements for loss rates or delay times, such as multimedia streaming and interactive gaming, Measurement-Based Admission Control (MBAC), which bases admission decisions on the measurement of the dynamic traffic load of the network, has been recognized as an appropriate and efficient admission control mechanism. Several proposed MBAC algorithms measure the available bandwidth of a network in making an admission decision.

Recently, a technique known as endpoint admission control has been proposed. According to the technique, a gateway responds to a request for admission to a network by first probing the network with test packets and listening for responses to the packets. The gateway then determines, based on the responses, the packet loss rate of the network. If the packet loss rate is above an acceptable level, then the request is denied.

SUMMARY OF THE INVENTION

The present invention is directed to a method and system for managing admission to a network, in which the packet delay and packet loss rate of the network are considered in making an admission decision. To determine the packet delay of the network, groups of probing packets are sent to a remote node. The remote node responds with echoed versions of the probing packets. The responses are analyzed to determine the total travel time of the probing packets and, based on the total travel time, the current delay conditions. If the packet delay of the network is insufficient to make an admission decision, then the packet loss rate of the network is also measured and considered.

By taking into account both the packet delay status of a network as well as the packet loss rate, the present invention allows admission control systems to detect the fluctuating conditions of the network more quickly and sensitively without overloading the network.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7 is an example of steps that may be executed in carrying out step 350 of FIG 6; and FIG. 8 is an example of steps that may be executed in carrying out step 350 of FIG. 6.

DETAILED DESCRIPTION OF THE INVENTION

The invention is generally directed to a method and system for managing admission to a network, in which the packet delay being experienced by the network is measured and taken into account. In various embodiments of the invention, cumulative probability distribution plots of the packet delay during conditions of high packet loss and low packet loss are created and juxtaposed to find a threshold value. The threshold value is used to derive upper and lower cut-off values for acceptable packet delay. The current delay state of the network is compared to these cut off values to determine whether or not to admit new packets to the network. If the packet delay measurements are not sufficient to make a decision, then the invention also measures and takes into account the packet loss rate of the network.

Although it is not required, the present invention may be implemented using instructions, such as program modules, that are executed by a computer. Generally, program modules include routines, objects, components, data structures and the like that perform particular tasks or implement particular abstract data types. The term "program" includes one or more program modules.

The invention may be implemented on a variety of types of machines, including cell phones, personal computers (PCs), hand-held devices, multi-processor systems, microprocessor-based programmable consumer electronics, network PCs, minicomputers, mainframe computers and the like. The invention may also be employed in a distributed system, where tasks are performed by components that are linked through a communications network. In a distributed system, cooperating modules may be situated in both local and remote locations.

Figure 1:
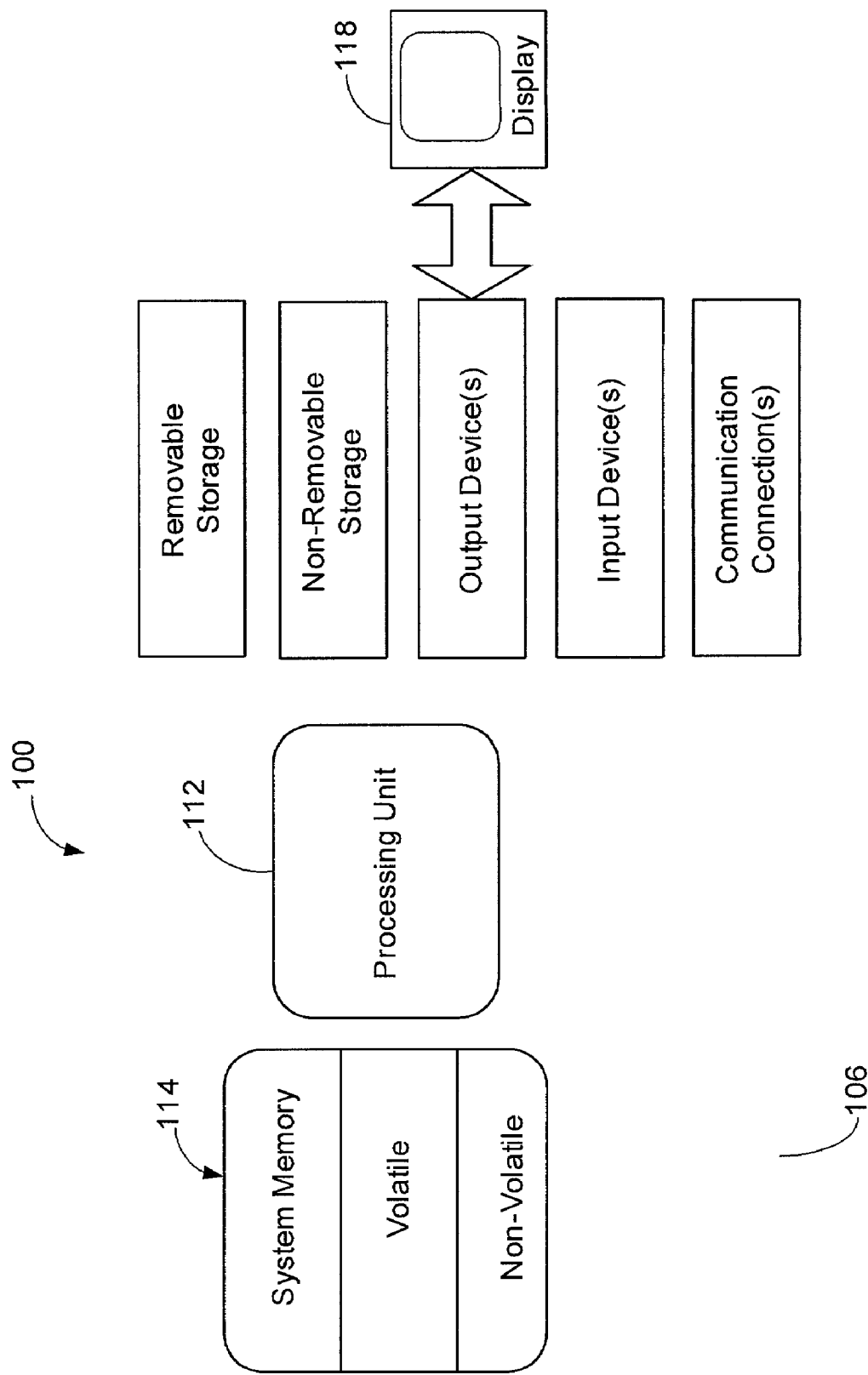
FIG. 1 is an example of a computer on which various embodiments of the invention may be implemented.

Referring to FIG. 1, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 1 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

An example of a network system in which embodiments of the invention may be implemented is described with reference to FIG. 2. The network system comprises computers 100, 101 and 102 communicating with a network 150, represented by a cloud. The computer 100 is assumed to be a gateway, server or similar device through which the computers 101 and 102 can communicate with the network 150. The network 150 may include many well-known components, such as routers, gateways, hubs, etc.

In accordance with an embodiment of the invention, a computer user, for example, user 101a of computer 101 or a user 102a of computer 102 may execute a program that requests permission to send or receive a data flow (containing data packets) to or from the network 150. The computer 100 is responsible for determining whether or not to grant the request based on the traffic conditions of the network 150. In general, if the traffic on the network 150 does not allow the requesting program to receive a Quality of Service (QoS) that is sufficient for the type of data to be sent or received, the request is rejected. Otherwise, the request is granted.

Figure 3:
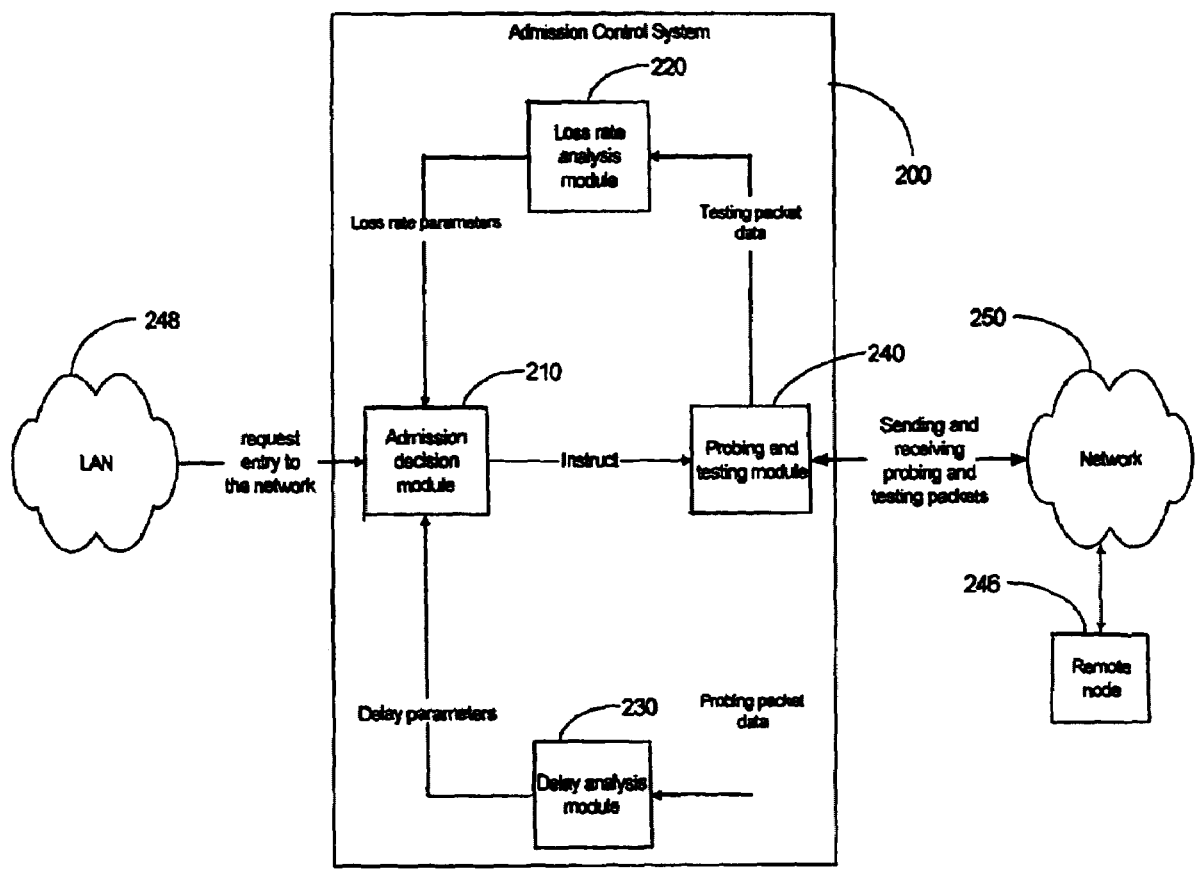
FIG. 3 illustrates an example software architecture according to an embodiment of the invention.

Referring to FIG. 3, an example of an architecture for implementing the invention is shown. In its most basic configuration, the admission control system, generally labeled 200, is communicatively linked to the network 250 and to a local area network (LAN) 248. In response to a request from a device on the LAN 248 for packets to be sent or received to or from the network 250, the admission control system 200 determines whether to grant the request based on the traffic conditions of the network 250.

The admission control system 200 (FIG. 3) comprises an admission decision module 210, a delay analysis module 230, a loss rate analysis module 220, and a probing and testing module 240. The probing and testing module 240 sends and receives probing packets to measure the delay being experienced by packets as they travel over the network 250. The probing and testing module 240 also sends testing packets over the network 250 to determine the packet loss rate of the network 250. When responses to the probing packets are received, the delay analysis module 230 analyzes the responses to calculate delay parameters. Similarly, when responses to the testing packets are received, the loss rate analysis module 220 analyses the responses to calculate packet loss rate parameters. The admission decision module 210 detects requests from the LAN 248 for access to the network 250. The admission decision module 210 makes admission decision based on the delay parameters and loss rate parameters.

According to an embodiment of the invention, the admission control system 200 uses the packet delay—i.e. the amount of delay being experienced by packets traveling over the network to a remote node 246—as a criterion to make an admission decision. The probing and testing module 240 periodically sends groups of probing packets and receives responses that are used to measure the network delay. To prevent the probing packets themselves from impacting the network traffic, the probing packets are transmitted at an irregular interval. In one implementation, the probing packets are sent at an exponential interval, with a typical average of 1 or 2 seconds between packets. This helps prevent the probing packets from introducing synchronization effects in the network. In an embodiment of the invention, each probing packet sent by the probing and testing module 240 is a "PING" packet. As is well-known in the art, a computer that receives a "PING" packet is expected to copy the contents of the packet and send an echoed version of the "PING" packet back to the sender. Each "PING" packet has an index number that is included in the corresponding echoed response. This allows a "PING" sender to know which "PING" is being responded to.

Referring again to FIG. 3, the probing packets are sent by the probing and testing module 240 to the remote node 246. The remote node 246 generates responses to the probing packets. These responses are received by the probing and testing module 240, which determines the round trip travel time for each probing packet. The round trip travel time is the interval of time between the transmission of a probing packet and the receipt of a response to the probing packet. The probing and testing module 240 sends data representing the results of the probing packet transmissions, such as the round trip travel times and an indication of how many probing packets were lost (referred to as probing packet data) to the packet delay analysis module 230. The packet delay analysis module 230 calculates the queuing delay for each probing packet. The queuing delay represents the total amount of time that the probing packet was forced to wait at each intermediate node while traveling to and from the remote node 246. The queuing delay for a packet is calculated by subtracting the propagation delay (the time the packet actually spent traveling over the network) from the round trip travel time. The propagation delay can be approximated by using historical data. For example, the minimum delay experienced by PING packets over a period of one day or one week may be used to approximate the propagation delay. The delay analysis module 230 also calculates a set of delay parameters for the network 250. These parameters include a current delay shape ($D_C$), an expected delay shape ($D_E$), a delay shape threshold ($D_{TH}$), a delay shape-high ($D_H$) and a delay shape-low ($D_L$). The nature of these parameters and an example of how to calculate them will be described below in further detail.

Referring again to FIG. 3, the delay analysis module 230 sends the calculated delay parameters to the admission decision module 210, which analyzes the delay parameters to determine whether or more data is needed to make an admission decision. If the delay parameters are not, by themselves, sufficient to make an admission decision, then the admission decision module 210 instructs the probing and testing module 240 to send testing packets to the remote node 246 to test the packet loss rate of the network 250. The testing packets, like the probing packets, may be "PING" packets. The responses to the testing packets are received by the probing and testing module 240. The probing and testing module 240 determines which testing packets were lost and sends data representing the number of packets that were sent and the number of packets that were lost (referred to as packet loss data) to the loss rate analysis module 220. The loss rate analysis module 220 calculates loss rate parameters based on the data received from the probing and testing module 240. These include the current loss rate ($L_C$) of the testing packets and the maximum acceptable or threshold loss rate ($L_{TH}$). The loss rate analysis module 220 sends the loss rate parameters to the admission decision module 210. If needed, the admission decision module 210 can take into account the packet loss rate $L_C$ and compare it to the threshold loss rate $L_{TH}$ to help it make a decision as to whether or not data packets from the LAN 248 are permitted to enter the network 250.

Figure 4:
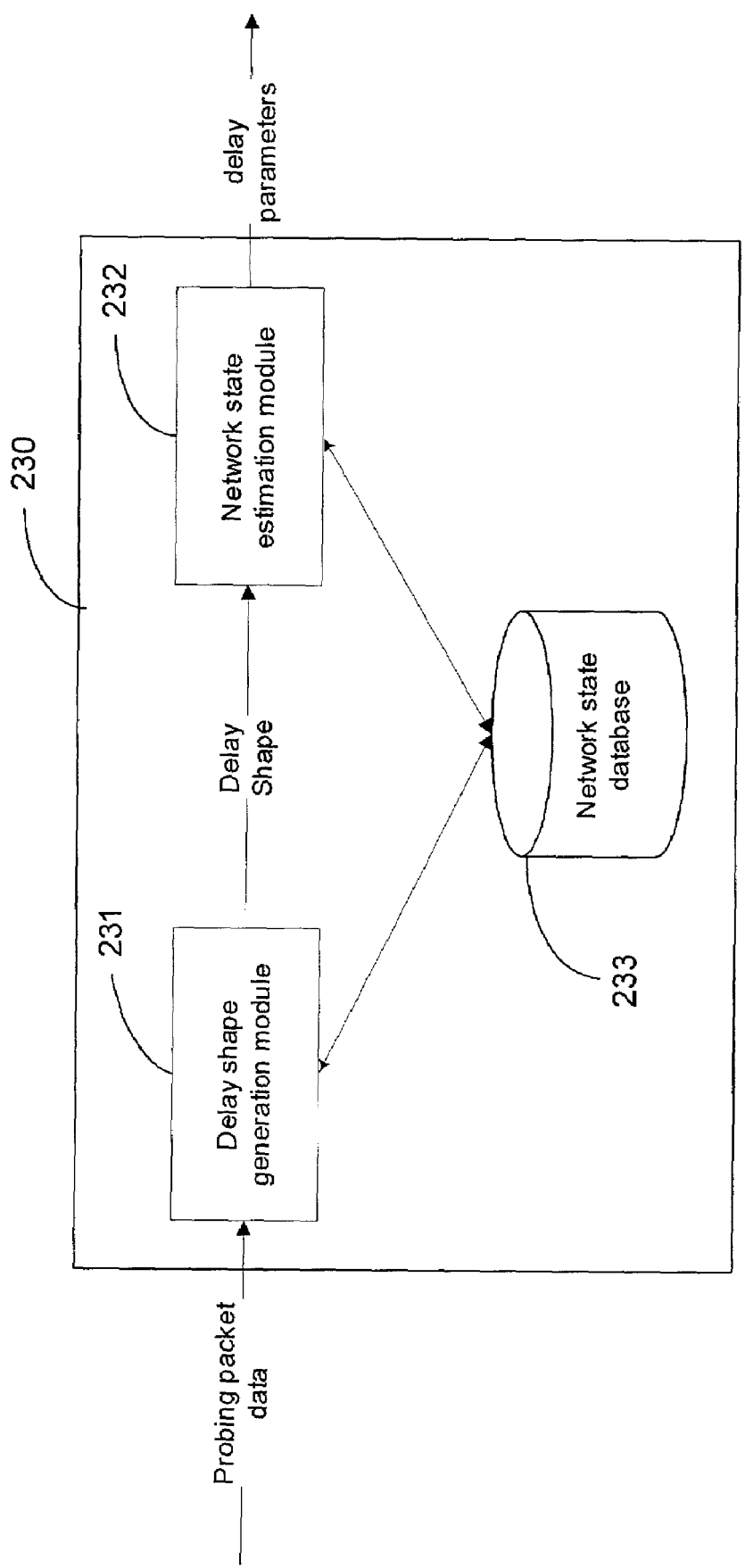
FIG. 4 is a structural schematics diagram showing components of a packet delay probing module according to an embodiment of the invention.

An example of modules used to implement the functions of the delay analysis module 230 (FIG. 3) is shown in FIG. 4. In this example, the delay analysis module 230 includes a delay shape generation module 231, a network state estimation module 232 and a network state database 233. The delay shape generation module 231 calculates the queuing delay for each probing packet for which a response was received by the probing and testing module 240. The delay shape generation module 231 uses the queuing delays that were calculated for each group of probing packets to calculate delay parameters, including the current delay shape ($D_C$), the estimated delay shape ($D_E$), the delay shape-threshold ($D_{TH}$), the delay shape-high ($D_H$), and the delay shape-low ($D_L$). The delay shape generation module 231 also stores values for the current delay shape $D_C$ in the network state database 233 for the purpose of subsequently generated cumulative probability distribution plots, such as those shown in FIG. 5a and discussed below. The module 231 sends the delay parameters to the network state estimation module 232. The network state estimation module 232 uses the delay parameters to estimate the current delay conditions of the network as well as the expected future delay conditions of the network. The network state estimation module 232 stores data representing the estimated network delay and the estimated future delay in the network state database 233.

Although the probing and testing module 240 (FIG. 3) need not transmit probing packets in groups, the delay analysis module 230 analyzes the results of the probing packet transmissions by considering the probing packets in groups. For example, the current delay shape $D_C$ of the network 250 is defined by the delay analysis module 230 as the average delay minus the minimum delay for a group of probing packets. According to an embodiment of the invention, the number of probing packets in each group is less than ten, e.g. three packets per group or five packets per group. In various embodiments of the invention, the delay shapes of many groups of probing packets are used to create cumulative probability distribution plots. These plots are then used to derive the delay shape threshold ($D_{TH}$). The delay shape threshold ($D_{TH}$) is a point at which the delay shape of the network in a congested state equals the delay shape of the network in an uncongested state. The delay shape-high represents the highest acceptable delay shape for the network, while the delay shape-low represents the lowest acceptable delay shape for the network. The delay shape-high and delay shape-low parameters may be determined, at least in part, by settings put into place by an administrator of the LAN 248 (FIG. 3).

An example of how the delay shape (D) and delay shape threshold ($D_{TH}$) parameters are calculated in an embodiment of the invention will now be described. As previously discussed, D is equal to the average delay experienced by packets minus the minimum delay. In one implementation, for example, the probing and testing module 240 (FIG. 3) transmits probing packets at exponential intervals to the remote node 246 and listens for echoed responses. For those probing packets to which responses are received, the probing and testing module 240 calculates the round trip times (the time interval between the sending of each probing packet and the receipt of the echoed response), and reports those round trip times to the delay analysis module 230. For every five (5) probing packets to which responses have been received, the delay analysis module 230 calculates the average queuing delay and subtracts the minimum queuing delay to arrive at a value for D. The delay analysis module 230 also records numerous delay values and, when a statistically significant number of values are recorded, calculates cumulative probability distributions for the delay values.

Figure 5A:
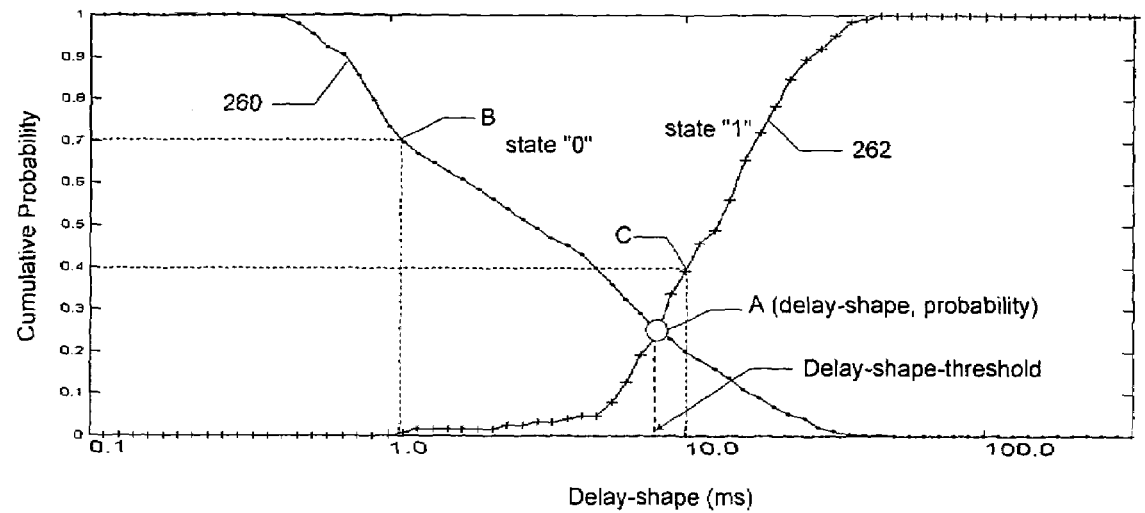
FIG. 5*a*, and FIG. 5*b* are examples of cumulative probability distribution plots for the delay shape.
Figure 5B:
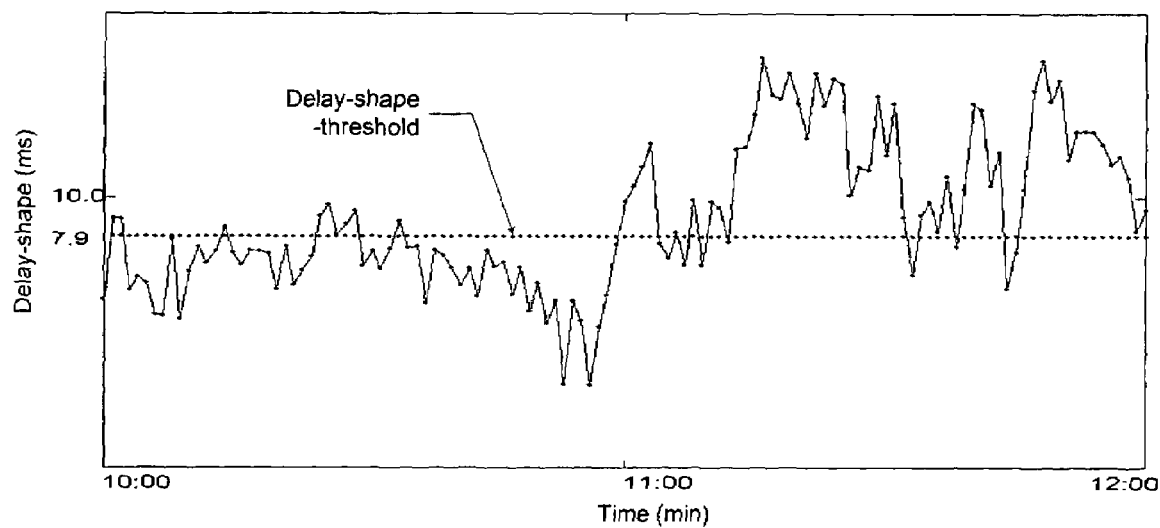

Referring to FIGS. 5a and 5b, example cumulative probability plots of the kind that are created by the delay analysis module 230 (FIG. 3) are shown. Each plot labeled 260 and 262 respectively, is rendered on an x-axis and a y-axis. The x-axis of each plot represents values for the delay shape on a semi-logarithmic scale, while the y-axis represents cumulative probability values. The plot 260 represents the delay state of the network when it is relatively unloaded, such as when the packet loss rate is less than 1%. This state is also referred to herein as "state 0." The values on the y-axis of the plot 260 are equal to one minus the cumulative probability (1−p) for each corresponding delay shape on the x-axis. For example, the point B on the plot 260 is one minus the cumulative probability that a group of packets has experienced a delay shape of 1.0 milliseconds. In the case of point B, this value (1−p) is about 0.7.

The plot 262 (FIG. 5a) represents the delay state of the network 250 (FIG. 3) when it is relatively loaded, such as when the packet loss rate is greater than or equal to 1%. This state is also referred to herein as "state 1." The plot 262 represents the cumulative probability of the occurrence of various delay shapes. For example, the point C on the plot 262 is the cumulative probability that a group of packets has experienced a delay shape of 10.0 milliseconds. In the case of point C, the probability p is about 0.4.

In FIG. 5a, it can be seen that when the plots 260 and 262 are juxtaposed, they cross at a crossing point A which, in this example, corresponds to a delay shape of about 7.9 milliseconds, and a cumulative probability of about 0.25. At point A, the cumulative probabilities for packets having a delay shape of 7.9 milliseconds in network states "0" and "1" are identical. The delay shape at point A (7.9 milliseconds) is referred to as the delay shape threshold ($D_{TH}$).

To further illustrate the delay shape-threshold, FIG. 5b illustrates the evolution of the delay shape over an interval of time, wherein the interval of time starts at 10:00 AM and ends at 12:00 noon. In FIG. 5b, the delay shape-threshold in FIG. 5a is represented by dotted line. It can be seen that the delay shape-threshold partitions the delay shape curve vs. time. The delay shape of the network between 10:00 AM and 11:00 AM is generally less than the threshold 7.9, whereas, the delay shape of the network between 11:00 AM and 12:00 AM is generally higher than the threshold 7.9. As shown in FIG. 5b, the condition of the network 250 changes dynamically, and the delay shape threshold helps to quantify the dynamic nature of the network delay state.

An example of how the delay shape-high ($D_H$) and delay shape-low ($D_L$) parameters are calculated in an embodiment of the invention will now be described. The delay shape-high parameter $D_H$ can be calculated as follows:

$$D_H = \alpha \times D_{TH}$$

where $\alpha$ represents an acceptable balance between efficient resource utilization and the quality of service required by the new traffic that is requesting entry into the network. While the value of $\alpha$ can be set and adjusted according to the results of previous groups of transmitted probing packets, it is known that $\alpha$ may be set equal to a value of one (1) in the simplest case, so that $D_H$ is equal to $D_{TH}$. Similarly, the delay shape-low parameter $D_L$ can be calculated as follows:

$$D_L = \beta \times D_H$$

where $\beta$ represents a trade-off between making a quick decision and making a correct one. While the value of $\beta$ can be set and adjusted according to the results of previous probing packets, it is known that, in the simplest case, $\beta$ may be set equal to a value of 0.8, so that $D_L$ is equal to $(0.8)D_H = (0.8)D_{TH}$.

Referring FIG. 6, an example of a procedure that may be followed by the admission decision module 210 (FIG. 3) in deciding whether or not to allow new packets to enter the network from the LAN 248 will now be described. The decision making procedure starts at step 300, in which the admission decision module 210 determines whether the current delay shape $D_C$ is higher than the delay shape-high $D_H$. If so, the request to enter the network is rejected at step 340.

If, at step 300, the current delay shape is lower than or equal to the delay shape-high, the procedure continues at step 310. At step 310, the admission control module 210 determines whether the current delay shape is higher than the delay shape-low $D_L$. If so, this means that the current delay shape is between the delay shape-high and delay shape-low, and that the packet delay data is not sufficient to make a proper admission decision. The packet loss rate data then needs to be analyzed and the procedure continues at step 320. If the result is negative at step 310, the procedure continues at step 350.

At step 320, the admission decision module 210 obtains the $L_C$ parameter from the probing and testing module 240. At step 330, the admission decision module 210 determines whether the current delay shape $D_C$ is lower than the delay shape threshold $D_{TH}$ and whether the current packet loss-rate $L_C$ is less than the packet loss-rate-threshold $L_{TH}$. If both of these conditions are true, then the request to enter the network is granted at step 370. Otherwise, the request is rejected at step 340.

If, at step 310 (FIG. 5), it is determined that the current delay shape is lower than the delay shape-low, suggesting that the network may accommodate new data packets, then the procedure continues at step 350. At step 350, the admission decision module 210 (FIG. 3) estimates the future delay shape of the network, represented by $D_E$. At step 360, the admission decision module 210 determines whether the $D_E$ is lower than the delay shape-low $D_L$. If so, the request to enter the network is granted at step 370. Otherwise, the process continues to step 380, at which the admission decision module 210 sets the current delay shape as the average of the delay shape-high $D_H$ and delay shape-low $D_L$. The procedure then continues at step 320 and step 330 as previously described.

Figure 6:
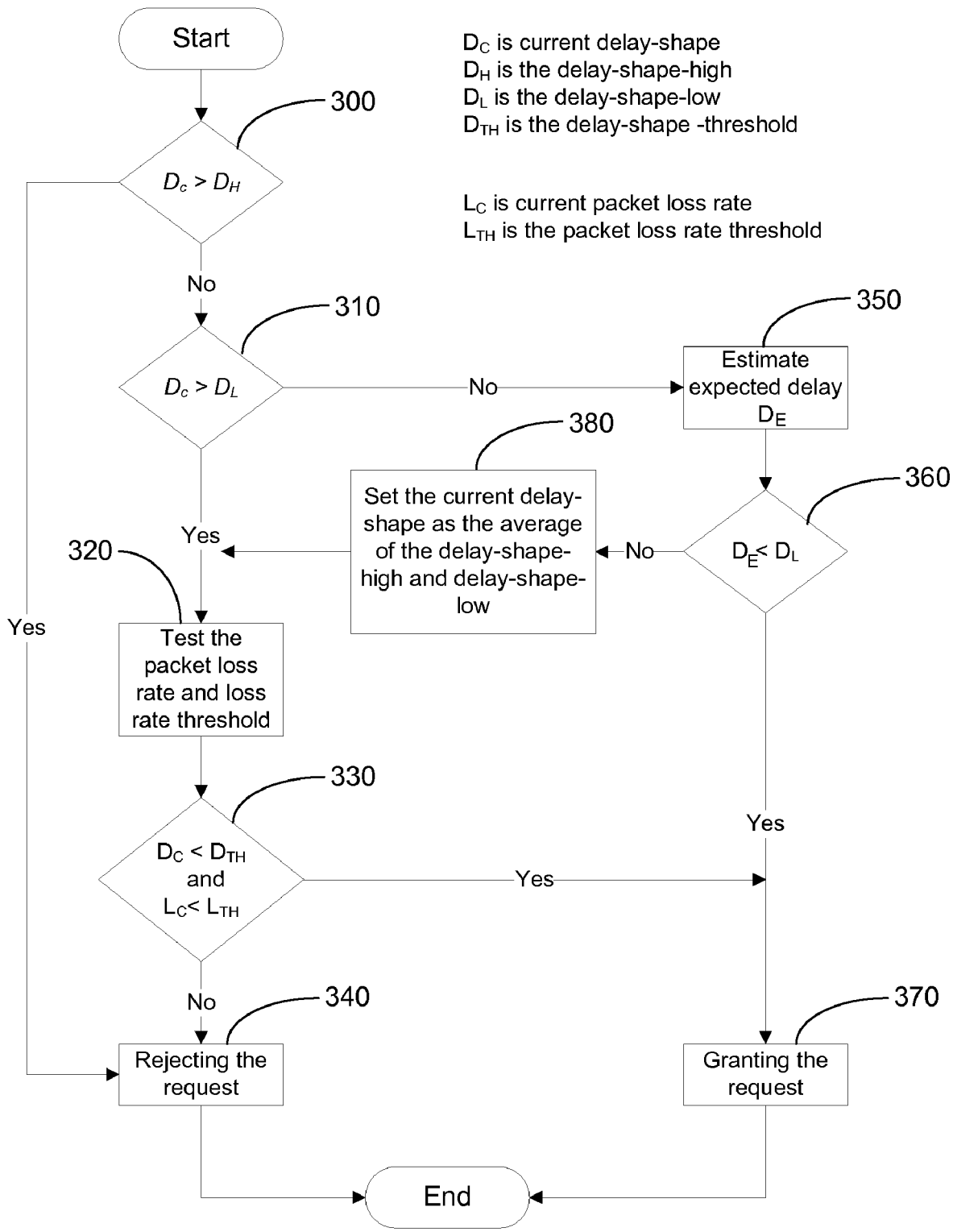
FIG. 6 is an example of steps that may be executed in making an admission decision.

In testing the packet loss rate and packet loss rate threshold at step 320 in FIG. 6, further steps may be performed. FIG. 7 shows an example of such steps. In keeping with an embodiment of the invention, the packet loss rate data is utilized only when the delay shape data is not adequate for making a proper admission decision. Accordingly, the process of testing the packet loss rate parameters is initiated by an instruction sent from the admission decision module 210 (FIG. 3) to the probing and testing module 240 at step 321. Upon receiving the instruction, the probing and testing module 240 sends testing packets to the remote node 246 via the network 250 at step 322. The testing packets are sent at the same rate as that required by the data traffic for which entry is being requested. At step 323, the packet loss rate analyzer 220 analyzes the responses to the test packets to calculate the current packet loss rate $L_C$. According to one embodiment, the packet loss rate is equal to $100\% \times N/1000$, wherein 1000 testing packets are sent and wherein N is equal to the number of packets lost.

In estimating the expected delay $D_E$ shape at step 350 in FIG. 6, further steps may be performed, as shown in FIG. 8. At step 351, it is assumed that the distribution of the network is $$A(t) = \sum_{i=1}^{n} X_i(t),$$

wherein $X_i(t)$ represents independent individual packets. It is also assumed each packet or set of packets can be considered an independent identical stochastic process. When the traffic number is large, the stationary bandwidth distribution of the network traffic is Gaussian distribution according to the Central Limit Theory, and has a mean $\mu_0$, and a variance $\sigma^2$. The distribution may then be written as: $N(\mu_0, \sigma^2)$.

Figure 2:
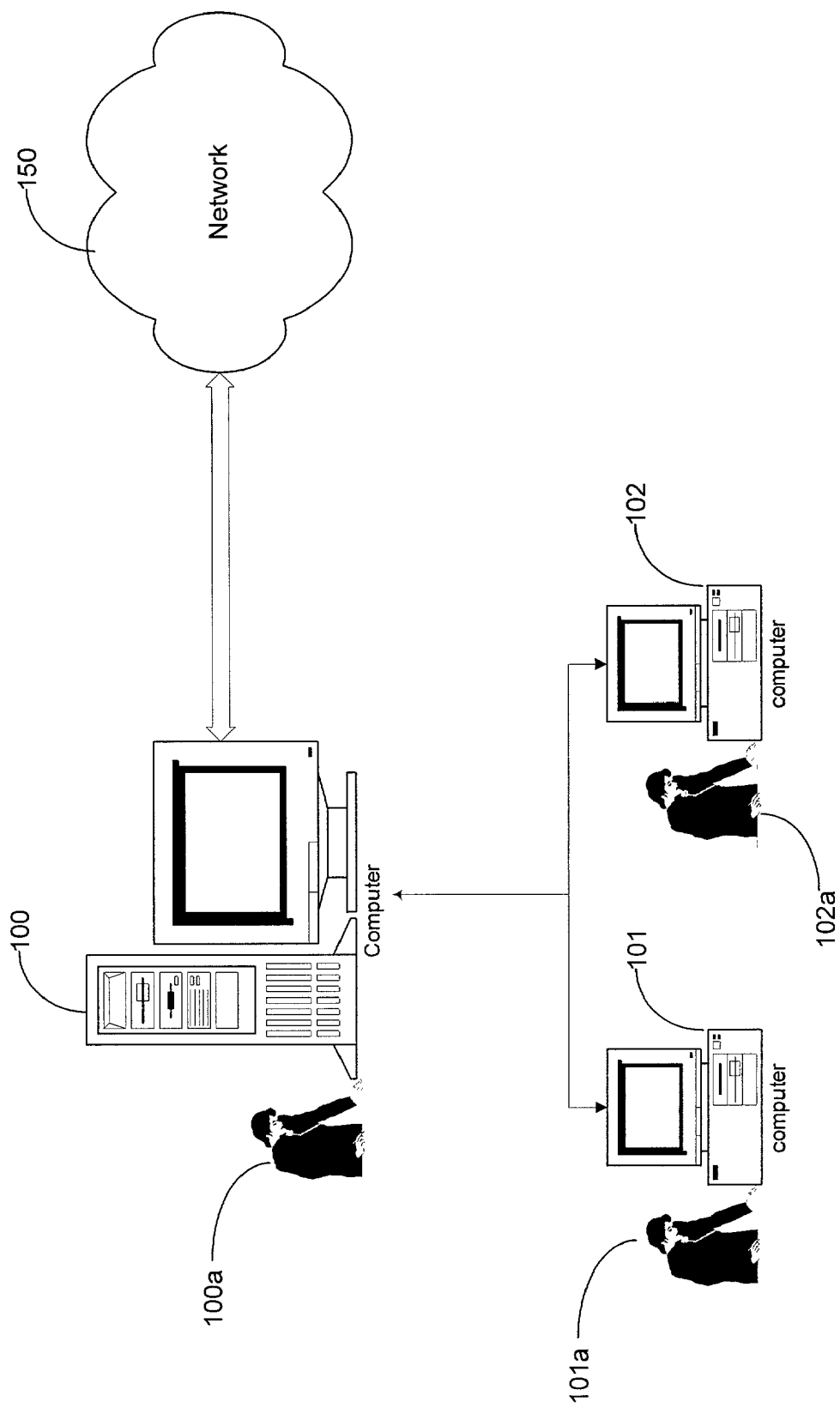
FIG. 2 is an example of a network environment in which various embodiments of the invention may be implemented.

At step 352, the expected delay shape $D_E$ is defined as $D_E = D_C + \Delta D$ wherein $\Delta D$ denotes the expected change of the current delay after the new packets from the LAN 248 are admitted to the network 250 (FIG. 2). At step 353, the expected change of the delay $\Delta D$ is calculated. $\Delta D$ is based on the expected impact that sending the new packets to the network will have on the delay being experienced by the network. There are generally two aspects to consider in this regard. First, the new packets will be appended to the various queues in the network 250, thus increasing the queuing delay. And second, the new packets will increase the probability of queuing delays in the network 250. For example, if the new data packets comprise a data flow of S, are to be sent at a rate of R and the network linking capacity is C, then the increase in queuing length expected to be caused by the new data flow can be estimated as S/C. Given the Gaussian distribution function, the impact on the queuing probability of the new data flow can be estimated as:

$$P_{new} = \int_{-R/C}^{\infty} p_A(x) dx,$$

wherein $P_{new}$ is the queuing probability after introducing the new data flow to the network, $p_A(X)$ is the bandwidth distribution of the traffic in accordance with the Gaussain traffic distribution. From the equation of $P_{new}$, it can be further deduced that, $$P_{new} = \int_{-R/C}^{\infty} p_A(x)dx < \int_i^{\infty} p_A(x)dx + R/C = P_0 + R/C.$$

Therefore, $P_{new}$ approximates $P_0+R/C$. Consequently, the expected round-trip delay of the network $D_E$ can be estimated as $D_E=D_C+2(P_0+R/C) \times S/C$.

It can thus be seen that a new a useful method and system for managing the admission of data to a network has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for managing the admission of data to a network, the method comprising:
   receiving a request for the data to be admitted to the network;
   calculating a set of delay parameters for the network, the delay parameters including a current delay shape ($D_C$), an expected delay shape ($D_E$), a delay shape high ($D_H$), and a delay shape low ($D_L$); and
   granting the request if:
   the current delay shape ($D_C$) is not greater than the delay shape high ($D_H$), and the current delay shape ($D_C$) is not greater than the delay shape low ($D_L$), and the expected delay shape ($D_E$) is less than the delay shape low ($D_L$).

2. The method of claim 1 wherein the delay state high ($D_H$) represents the highest acceptable delay shape for the network.

3. The method of claim 1 wherein the delay state low ($D_L$) represents the lowest acceptable delay shape for the network.

4. The method of claim 1 wherein the set of delay parameters is calculated based on, at least in part, a probing method comprising:
   sending a plurality of probing packets to a remote node via the network;
   receiving a plurality of response packets sent from the remote node, each of the plurality of response packets corresponding to one of the plurality of probing packets;
   calculating a set of delay values using the time interval between sending each of the plurality of probing packets and receiving each corresponding response packet of the plurality of response packets; and
   calculating an average delay and a minimum delay based on, at least in part, the set of delay values.

5. The method of claim 4 wherein the current delay shape is equal to the average delay minus the minimum delay.

6. The method of claim 4 wherein each of the set of delay values is calculated using a queuing delay.

7. The method of claim 1 further comprising:
   calculating the set of delay parameters to further include a delay shape threshold ($D_{TH}$); and
   calculating a set of loss rate parameters for the network, the loss rate parameters including a current loss rate ($L_C$) and a loss rate threshold ($L_{TH}$).

8. The method of claim 7 further comprising granting the request if:
   the current delay shape ($D_C$) is not greater than the delay shape high ($D_H$), and
   the current delay shape ($D_C$) is not greater than the delay shape low ($D_L$), and
   the expected delay shape ($D_E$) is not less than the delay shape low ($D_L$), and
   the average of the delay shape high ($D_H$) and the delay shape low ($D_L$) is less than the delay shape threshold ($D_{TH}$), and
   the current loss rate ($L_C$) is less than the loss rate threshold ($L_{TH}$).

9. The method of claim 7 further comprising granting the request if:
   the current delay shape ($D_C$) is not greater than the delay shape high ($D_H$), and
   the current delay shape ($D_C$) is greater than the delay shape low ($D_L$), and
   the current delay shape ($D_C$) is less than the delay shape threshold ($D_{TH}$), and
   the current loss rate ($L_C$) is less than the loss rate threshold ($L_{TH}$).

10. The method of claim 7 wherein the delay state shape threshold ($D_{TH}$) is defined as a point at which a first cumulative probability delay shape distribution of the network in a congested state (state 1) is equal to a second cumulative probability delay shape distribution of the network in an un-congested state (state 0).

11. The method of claim 7 wherein the set of loss rate parameters is calculated based on, at least in part, a testing method comprising:
   sending a plurality of testing packets to a remote node via the network;
   receiving zero or more response packets sent from the remote node, each of the zero or more response packets corresponding to one of the plurality of testing packets;
   calculating a set of loss values using a first count of the plurality of testing packets and a second count of the received zero or more response packets; and
   calculating the current loss rate ($L_C$) and the loss rate threshold ($L_{TH}$) based on, at least in part, the set of loss values.

12. A system for managing the admission of data to a network, the system comprising:
   an admission decision module operable to evaluate a request for data to be admitted to the network;
   a probing and testing module coupled to the admission decision module and to the network;
   a delay analysis module coupled to the probing and testing module and to the admission decision module, and operable for calculating a set of delay parameters for the network, the delay parameters including a current delay shape ($D_C$), an expected delay shape ($D_E$), a delay shape high ($D_H$), a delay shape low ($D_L$), and a delay shape threshold ($D_{TH}$); and
   a loss rate analysis module coupled to the probing and testing module and to the admission decision module, and operable for calculating a set of loss rate parameters for the network, the loss rate parameters including a current loss rate ($L_C$) and a loss rate threshold ($L_{TH}$);

wherein the delay analysis module receives probing packet data, calculates at least a portion of the set of delay parameters based on, at least in part, the probing packet data, and stores at least a portion of the set of delay parameters in a network state database, and wherein the admission decision module grants or denies the request based on, at least in part, the set of delay parameters.

13. The system of claim 12 wherein the admission decision module grants or denies the request based on, at least in part, the set of loss rate parameters.

14. The system of claim 12 wherein the delay analysis module comprises:
a delay shape generation module;
a network state estimation module coupled to the delay shape generation module; and
the network state database coupled to the delay shape generation module and to the network state estimation module.

15. The system of claim 14 wherein the at least a portion of the set of delay parameters is used, at least in part, to calculate a congested cumulative probability delay shape distribution of the network (state 1) and an un-congested cumulative probability delay shape distribution of the network (state 0).

16. The system of claim 14 wherein the network state estimation module receives the at least a portion of the set of delay parameters and calculates estimations representing the estimated network delay and the future estimated network delay, and stores the estimations in the network state database.

* * * * *